United States Patent
Heydel et al.

(10) Patent No.: US 9,695,624 B2
(45) Date of Patent: Jul. 4, 2017

(54) HOUSEHOLD REFRIGERATION APPLIANCE WITH AN ELECTROMECHANICAL OPENING ASSISTANCE DEVICE

(71) Applicant: BSH HAUSGERAETE GMBH, Munich (DE)

(72) Inventors: Adolf Heydel, Waldenbuch (DE); Nikolaus Schmidt, Sindelfingen (DE); Klaus Dieckmann, Kuchen (DE)

(73) Assignee: BSH Hausgeraete GmbH, Munich (DE)

( * ) Notice: Subject to any disclaimer, the term of this patent is extended or adjusted under 35 U.S.C. 154(b) by 0 days.

(21) Appl. No.: 15/135,843

(22) Filed: Apr. 22, 2016

(65) Prior Publication Data
US 2016/0312516 A1 Oct. 27, 2016

(30) Foreign Application Priority Data
Apr. 22, 2015 (DE) .................. 10 2015 207 314

(51) Int. Cl.
*F25D 25/00* (2006.01)
*E05F 15/70* (2015.01)
(Continued)

(52) U.S. Cl.
CPC ............ *E05F 15/70* (2015.01); *E05F 15/614* (2015.01); *E05F 15/619* (2015.01);
(Continued)

(58) Field of Classification Search
CPC ....... E05F 15/70; E05F 15/614; E05F 15/619; F25D 23/02; F25D 23/028
See application file for complete search history.

(56) References Cited

U.S. PATENT DOCUMENTS

| 5,036,620 A * | 8/1991 | Beran ..................... E05D 15/54 49/141 |
| 5,988,709 A * | 11/1999 | Lee ...................... E05B 65/0042 292/199 |
| 6,338,536 B1 * | 1/2002 | Ueno .................. E05B 17/0033 312/405 |
| 9,062,911 B2 | 6/2015 | Keller et al. |

(Continued)

FOREIGN PATENT DOCUMENTS

| DE | 102006061083 A1 | 6/2008 |
| JP | H02146487 A | 6/1990 |

(Continued)

OTHER PUBLICATIONS

English translation of JP2001280827 from https://www4.j-platpat.inpit.go.jp/cgi-bin/tran_web_cgi_ejje?u=http://www4.j-platpat.inpit.go.jp/eng/translation/2016112206042487910435633554508213C8E068F8C7D655E540DB2AFDCE061B34.*

*Primary Examiner* — Daniel Rohrhoff
(74) *Attorney, Agent, or Firm* — Laurence A. Greenberg; Werner H. Stemer; Ralph E. Locher

(57) ABSTRACT

A household refrigeration appliance includes a heat-insulated body which has an inner container with a coolable interior for storing foodstuffs, a refrigeration device for cooling the coolable interior, an electromechanical opening assistance device, and a door leaf hinged relative to the body for opening and closing the coolable interior, or a drawer which is pushed into the coolable interior in the closed state, to close the interior, and is withdrawn at least partially from the coolable interior in the open state. The electromechanical opening assistance device has an electromechanical actuator configured when activated to automatically open the closed door leaf or the closed drawer at least partially by repositioning an operating element of the electromechanical opening assistance device. The electromechanical actuator has an electric motor, a drive pinion, a cylindrical gear with dual gearing, and a toothed rack.

13 Claims, 4 Drawing Sheets

(51) Int. Cl.
*F25D 23/02* (2006.01)
*E05F 15/614* (2015.01)
*E05F 15/619* (2015.01)
*F25D 23/06* (2006.01)
*F25D 25/02* (2006.01)
*H02K 7/116* (2006.01)
*H02P 6/08* (2016.01)

(52) U.S. Cl.
CPC ......... *F25D 23/028* (2013.01); *F25D 23/062* (2013.01); *F25D 25/025* (2013.01); *H02K 7/116* (2013.01); *H02P 6/08* (2013.01)

(56) References Cited

U.S. PATENT DOCUMENTS

| | | | | |
|---|---|---|---|---|
| 2010/0141107 A1* | 6/2010 | Kim | ................ | F25D 23/028 |
| | | | | 312/405 |
| 2011/0048060 A1* | 3/2011 | Kim | ................ | E05B 17/0029 |
| | | | | 62/449 |
| 2011/0083461 A1* | 4/2011 | Kim | ................ | E05F 15/619 |
| | | | | 62/264 |
| 2016/0312513 A1* | 10/2016 | Heydel | ................ | E05F 15/614 |
| 2016/0313050 A1* | 10/2016 | Yoon | ................ | E06B 7/18 |

FOREIGN PATENT DOCUMENTS

| | | |
|---|---|---|
| JP | H0377169 U | 8/1991 |
| JP | 2001280827 A | 10/2001 |
| JP | 2003240424 A | 8/2003 |

\* cited by examiner

HOUSEHOLD REFRIGERATION APPLIANCE WITH AN ELECTROMECHANICAL OPENING ASSISTANCE DEVICE

CROSS-REFERENCE TO RELATED APPLICATION

This application claims the priority, under 35 U.S.C. §119, of German application DE 10 2015 207 314.9, filed Apr. 22, 2015; the prior application is herewith incorporated by reference in its entirety.

BACKGROUND OF THE INVENTION

Field of the Invention

The invention relates to a household refrigeration appliance, having a heat-insulated body which has an inner container with a coolable interior for the storage of foodstuffs, a refrigeration device which is provided for the purpose of cooling the coolable interior, an electromechanical opening assistance device, and a door leaf which is hinged relative to the heat-insulated body and is provided for the purpose of opening and closing the coolable interior, or a drawer which is pushed into the coolable interior in the closed state, in order to close the interior, and is withdrawn at least partially from the coolable interior in the open state. The electromechanical opening assistance device has an electromechanical actuator which is configured when activated to automatically open the closed door leaf or the closed drawer at least partially by repositioning an operating element of the electromechanical opening assistance device.

Published, non-prosecuted German patent application DE 10 2006 061 083 A1 discloses a household refrigeration appliance having a heat-insulated body with an inner container. The inner container delimits a coolable interior. The household refrigeration appliance contains a door leaf which is hinged relative to the body and is provided for the purpose of opening and closing the interior, and a door opening aid which has an operating element and an air pressure sensor that is so configured as to ascertain an air pressure change within the coolable interior when a person presses and/or pulls on the closed door leaf, in order thereupon to automatically open the closed door leaf at least partially by the operating element.

SUMMARY OF THE INVENTION

The object of the invention is to specify a household refrigeration appliance featuring an electromechanical opening assistance device which provides assisted opening of a closed door leaf or a closed drawer and is particularly quiet in operation.

The object of the invention is achieved by a household refrigeration appliance, having a heat-insulated body which has an inner container with a coolable interior for the storage of foodstuffs, a refrigeration device which is provided for the purpose of cooling the coolable interior, an electromechanical opening assistance device, and a door leaf which is hinged relative to the heat-insulated body and is provided for the purpose of opening and closing the coolable interior, or a drawer which is pushed into the coolable interior in the closed state, in order to close the interior, and is withdrawn at least partially from the coolable interior in the open state. The electromechanical opening assistance device has an electromechanical actuator which is configured when activated to automatically open the closed door leaf or the closed drawer at least partially by repositioning an operating element of the electromechanical opening assistance device. The electromechanical actuator has an electric motor, a drive pinion, a cylindrical gear with dual gearing, and a toothed rack. The drive pinion is connected to a motor shaft of the motor and meshes with the input gearing of the cylindrical gear with dual gearing, the output gearing of the cylindrical gear with dual gearing engages with a toothed rack profile of the toothed rack, and the toothed rack is connected to the operating element.

In the case of a door leaf, this is a preferably hinged relative to an axis which preferably runs vertically. In addition to or as an alternative to the door leaf, the inventive household refrigeration appliance may have a drawer which is pushed into the coolable interior in the closed state, in order to close the interior, and is withdrawn at least partially from the coolable interior in the open state. In this case, the electromechanical opening assistance device is so configured as to open the closed drawer at least partially or to assist the opening thereof by the electromechanical opening assistance device when activation of the electromechanical opening assistance device is triggered by a person pressing and/or pulling on the closed drawer.

The refrigeration device is preferably a refrigerant circuit. The refrigerant circuit contains a compressor and, in particular, a condenser which is connected downstream of the compressor, a flow-control device which is connected downstream of the condenser, and an evaporator which is arranged between the flow-control device and the compressor.

An elastic magnetic seal is preferably attached to that side of the door leaf and/or drawer which faces the coolable interior, and fits closely against the heat-insulated body with a sealing effect when the door leaf and/or drawer is closed. The magnetic seal is elastic and therefore, when a person presses on the closed door leaf or the closed drawer, the door leaf or drawer moves slightly in the direction of the coolable interior, whereby the air pressure within the coolable interior changes. As a result of the elastic magnetic seal, the magnetic seal does not detach from the heat-insulated body immediately when a person pulls on the closed door leaf or the closed drawer, whereby the air pressure within the coolable interior changes.

Such a change in the air pressure can be detected automatically by an air pressure sensor, whereby it can be inferred that a person wishes to open the closed door leaf or the closed drawer. It is then possible, for example, for a control device which is connected to the air pressure sensor to activate the electromechanical opening assistance device automatically. However, the electromechanical opening assistance device according to the invention may also be activated by other means, for example via a manually operated electrical button or via other types of sensors which can detect or at least predictively identify the intention of a person to open the closed door leaf or the closed drawer.

The electromechanical opening assistance device actuates an operating element, preferably a plunger, which can be moved from a retracted position into an extended position automatically, e.g. by an actuator, in order to open the closed door leaf or the closed drawer at least partially, preferably at least to the extent that the magnetic seal detaches from the heat-insulated body.

The electromechanical actuator has an electric motor, a drive pinion, a cylindrical gear with dual gearing, and a toothed rack. The drive pinion is connected to a motor shaft of the motor and meshes with the input gearing of the cylindrical gear with dual gearing, the output gearing of the cylindrical gear with dual gearing engages with a toothed rack profile of the toothed rack, and the toothed rack is connected to the operating element, thereby creating a particularly quiet electromechanical actuator which moves the operating element of the opening assistance device.

The toothed rack transfers the linear movement to the operating element. The toothed rack can be formed on a main body. The main body can have a holder into which the operating element, in particular the plunger, is inserted and locked. The operating element, in particular the plunger, can have a cap at its free end. The cap can be e.g. pushed or screwed onto the end of the operating element, in particular the plunger. In particular, in the case of an operating element or plunger which is made of a metallic material such as steel, the cap can be made of a synthetic material. The cap comes into contact with the inner side of the door leaf or drawer front that is to be opened, at least during the automatic opening process. Furthermore, the main body can also have a first cheek, which is able axially to support the output gearing of the cylindrical gear with dual gearing.

The motor can be an electric external rotor motor, whose external rotor pot has a hollow shaft section which carries the drive pinion. The external rotor pot can be formed integrally with the hollow shaft section and/or integrally with the drive pinion.

The input gearing of the cylindrical gear with dual gearing can have a transformation ratio of 6 to 1 with the drive pinion. The cylindrical gear with dual gearing has two cylindrical gears, which can be integrally interconnected in particular, wherein the one cylindrical gear having a large diameter forms the input gearing and the other cylindrical gear having a small diameter forms the output gearing which engages with the toothed rack.

The drive pinion can be arranged at such a distance from the cylindrical gear with dual gearing that the outside diameter of the drive pinion comes into contact with the pitch diameter of the input gearing of the cylindrical gear with dual gearing. Alternatively or additionally, the drive pinion can be arranged at such a distance from the cylindrical gear with dual gearing that the pitch diameter of the drive pinion comes into contact with the outside diameter of the input gearing of the cylindrical gear with dual gearing. By this means and by virtue of the single gear stage, a high level of efficiency and a high load-bearing capacity are achieved in addition to the reduction in noise.

The toothed rack can have a first rolling surface on a toothed rack wall which is on the opposite side to the toothed rack profile, wherein at least one rolling element, in particular at least one smooth-wall or toothed supporting roller, rolls on the first rolling surface and is further supported, on its side opposite the first rolling surface, against the housing.

The toothed rack wall of the toothed rack, which toothed rack wall is on the opposite side to the toothed rack profile, can therefore have a second toothed rack profile into which or with which a supporting toothed wheel as a rolling element engages or meshes respectively. In this respect, such a supporting toothed wheel can form the toothed supporting roller. Accordingly, the housing can have a third toothed rack profile on its side which faces the rolling surface, i.e. the second toothed rack profile, wherein the supporting toothed wheel is supported against the housing via said third toothed rack profile. In a specific embodiment variant, the electromechanical actuator has two supporting toothed wheels, which have rotational axes that are aligned in parallel with each other and are arranged at a distance from each other. In this case, the two supporting toothed wheels both mesh with the same second toothed rack profile and the same third toothed rack profile. The at least one supporting toothed wheel, in particular the two supporting toothed wheels, can have an undulating profile. The second and third toothed rack profile can also be designed as an undulating profile accordingly. The supporting toothed wheels can absorb the radial forces resulting from the motive forces of the toothed wheel and the toothed rack, and divert them into the housing.

Accordingly, the main body can have a rolling surface, in particular in the form of an undulating profile, on a toothed rack wall which is on the opposite side to the toothed rack profile of the toothed rack or main body. Two rolling elements in the form of toothed supporting rollers roll on such a rolling surface, for example. The toothed supporting rollers can each have an undulating profile. The rolling elements, in particular the supporting rollers, can be supported against the housing by a fixed second rolling surface on that side of the rolling elements or supporting rollers which is opposite to the rolling surface. The second rolling surface can either be formed on a separate supporting element which is fastened to the housing, or so formed as to be directly integral with an inner wall of the housing.

The supporting rollers can be provided with undulating teeth and, unlike a roller bearing, thereby allow non-slip operation. In comparison with a roller having conventional tooth geometry, the undulating teeth allow smooth rolling without notches.

The cylindrical gear with dual gearing can form a cheek accordingly, and/or the toothed rack can have a cheek, on which the at least one rolling element is axially guided, in particular the two supporting toothed wheels are axially guided.

The cylindrical gear with dual gearing can form a second cheek, on which not only the output gearing or the toothed rack profile are axially guided, but on which the at least one rolling element or the two supporting rollers are also axially guided at the same time.

The electromechanical opening assistance device generally can have a housing, in particular two housing halves, and the housing, the housing halves, the drive pinion, the cylindrical gear with dual gearing, the toothed rack, the at least one rolling element and/or the operating element can be made of glass-fiber reinforced polyamide (PA-GF).

In order to achieve a compact and quiet structural unit, the two housing halves, in particular a housing base and a housing cover, can be included in the gear and motor mountings. The stator seat then forms part of the housing base. In this embodiment variant, the rigid motor axle and the stator are centered relative to the rotor here. The motor is constructed as an external rotor in this case. The support of the bearing forces and/or output forces is provided mainly by the housing shells. Installation/assembly of the motor is particularly easy, since the stator is first inserted, locked or screwed into the stator seat in the base of the housing. The construction is adequately secured against rotation and removal. The assembly of the axle pin and the motor is effected by simple insertion. The rotor bell is centered by the permanently excited magnetic circuit itself. Precise running of the rotor is ensured by the limited bearing play. Hardened and coated bearing pins ensure low-friction running. Lubrication of the slide bearing is therefore not essential.

Therefore the electromechanical opening assistance device generally has a housing, in particular two housing halves, in which are arranged, mounted or fastened at least the electric motor, the drive pinion, the cylindrical gear with dual gearing, the toothed rack, the at least one rolling element and the operating element.

In all embodiment variants, the electric motor can be a permanent-field alternating-current synchronous motor which is operated in particular at a rotational speed between 500 and 1,000 revolutions per minute, in particular at a rotational speed between 700 and 800 revolutions per minute.

A so-called BLDC motor with an extremely flat structural format and a torque of approximately 0.27 Nm at approximately 780 r.p.m. can be used for the drive, in order to provide high torque values at minimal rotational speeds. Sinusoidal phase voltages/currents ensure that the drive has a torque curve with largely low harmonic distortion.

In all corresponding embodiments, the electromechanical opening assistance device can have a first housing half and a second housing half, at least one of the two housing halves having a fastening projection in this case, and the electric motor can have a stator with a central opening, in particular a stator winding with a central opening, by which opening the stator or the stator winding, for the purpose of fastening to the respective housing half, is fixed on, in particular pressed, pushed and/or locked onto the fastening projection.

In order to fasten the stator to one of the housing halves, it is fixed onto the fastening projection by the central opening, i.e. the stator is placed onto the fastening projection in such a way that the fastening projection passes through the central opening.

In a first embodiment variant, the stator can be pressed onto the fastening projection with frictional engagement using a seating fit. To this end, the internal diameter of the central opening of the stator can be adapted to the external diameter of the fastening projection.

In a second embodiment variant, the stator can be placed onto the fastening projection first and then fastened with positive engagement by a separate, detachably fastened end cover. To this extent, the stator can be fixed with positive engagement between the fastening projection and the end cover in an axial direction, and fixed with at least frictional engagement, and optionally also with positive engagement, in a radial direction.

In a third embodiment variant, the stator can be placed onto the fastening projection and locked on by at least one and in particular a plurality of locking hooks which are preferably distributed uniformly over the area. At its foot section, the at least one locking hook can be permanently connected to the fastening projection or formed integrally therewith, and the elastic head section of the locking hook then grasps the stator, in particular the stator laminated core, from the outside.

The electromechanical opening assistance device can have a first housing half and a second housing half, wherein a rigid axle pin is mounted between the two housing halves and the motor has a rotor, in particular a permanent-magnet rotor, which contains a hollow rotor shaft that is rotatably mounted on the axle pin and seated rotatably between the two housing halves. The axle pin can be made of a surface-hardened steel, in particular.

According to a preferred embodiment variant of the household refrigeration appliance according to the invention, the assistance apparatus has a housing, within which essentially all of the components of the assistance device are arranged. In particular, all of the electrical and mechanical components required for the operation of the assistance device are preferably arranged within the housing, possibly with the exception of an electric power supply. An operating element is preferably also arranged in the housing but, at least when in its extended position, projects at least partially out of the housing. The housing of the assistance device is preferably made of a synthetic material, in particular glass-fiber reinforced polyamide (PA-GF).

Other features which are considered as characteristic for the invention are set forth in the appended claims.

Although the invention is illustrated and described herein as embodied in a household refrigeration appliance with an electromechanical opening assistance device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
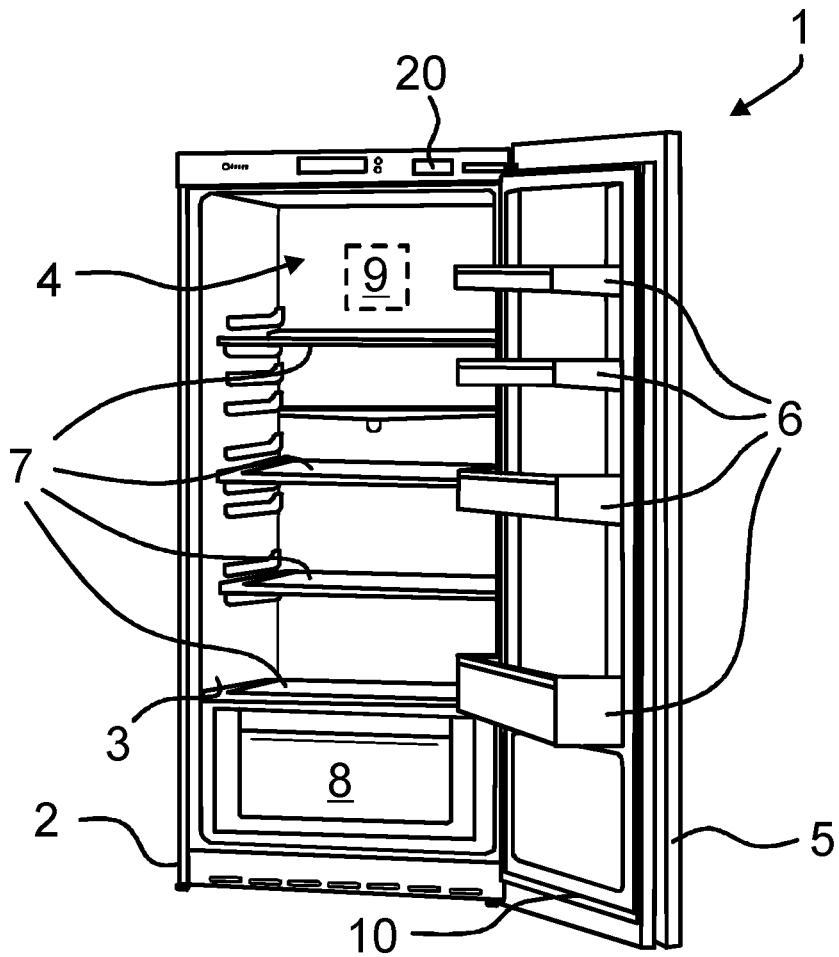
FIG. 1 is diagrammatic, perspective view of a household refrigeration appliance with a door leaf and an electromechanical opening assistance device for opening the door leaf according to the invention.

Referring now to the figures of the drawings in detail and first, particularly to FIG. 1 thereof, there is shown a perspective view a household refrigeration appliance 1, which contains a heat-insulated body 2 with an inner container 3 that delimits a coolable interior 4. The coolable interior 4 is provided for the purpose of storing non-illustrated foodstuffs.

In the case of the present exemplary embodiment, the household refrigeration appliance 1 has a hinged door leaf 5 for closing the coolable interior 4. In particular, the door leaf 5 is hinged relative to a vertical axis. The coolable interior 4 is accessible when the door leaf 5 is open as illustrated in FIG. 1.

In the case of the present exemplary embodiment, a plurality of door trays 6 for storing foodstuffs are arranged on that side of the door leaf 5 which faces towards the coolable interior 4. A plurality of shelf bases 7 in particular are arranged in the coolable interior 4 for the purpose of storing foodstuffs and, in particular, a drawer 8 in which foodstuffs can likewise be stored is arranged in a lower region of the coolable interior 4.

The household refrigeration appliance 1 contains a refrigeration device, in the form of a refrigerant circuit in particular, for the purpose of cooling the coolable interior 4. The refrigerant circuit contains in particular a compressor, a condenser which is connected downstream of the compressor, a flow-control device which is connected downstream of the condenser and takes the form of a restrictor tube or capillary tube in particular, and an evaporator which is arranged between the flow-control device and the compressor. The compressor is preferably arranged within a machine space of the household refrigeration appliance 1, the space being situated behind the drawer 8 in particular.

In the case of the present exemplary embodiment, the household refrigeration appliance 1 contains an electronic control device 9, this being so configured as to control the refrigeration device and in particular the compressor of the refrigerant circuit in a manner which is generally known to a person skilled in the art, such that the coolable interior 4 has at least approximately a desired temperature which is or can be preset. The electronic control device 9 is preferably so configured as to control the temperature of the coolable interior 4 in a closed-loop manner. In order to obtain the actual temperature of the coolable interior 4 as necessary, the household refrigeration appliance 1 can have at least one non-illustrated temperature sensor which is connected to the electronic control device 9.

Figure 2:
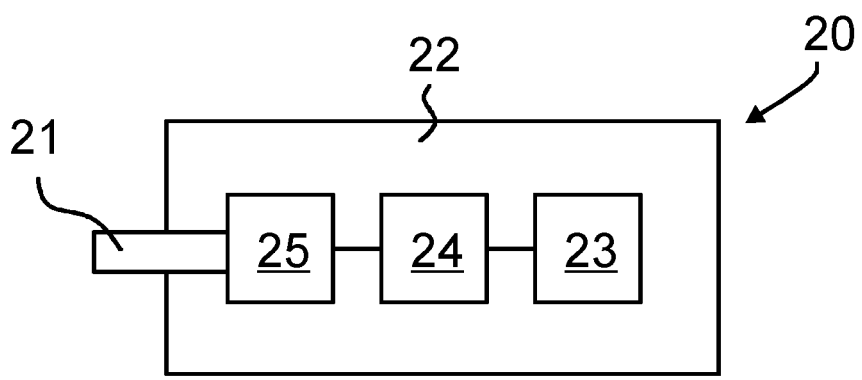
FIG. 2 is a schematic representation of the electromechanical opening assistance device.

The household refrigeration appliance 1 also has an electromechanical opening assistance device 20, which is so configured as to at least assist the opening of the closed door leaf 5. A schematic representation of the electromechanical opening assistance device 20 is shown in FIG. 2.

The electromechanical opening assistance device 20 is fastened in or on the body 2, for example, and contains an operating element 21, e.g. a plunger, which can be moved from a retracted position into an extended position automatically by an actuator 22 of the electromechanical opening assistance device 20. In its retracted position, the plunger 21 allows the door leaf 5 to close, or the plunger 21 is pushed into its retracted position when the door leaf 5 is closed. The actuator 22 contains an electric motor 23, a cylindrical gear with dual gearing 24, and a toothed rack 25.

In the case of the present exemplary embodiment, the household refrigeration appliance 1 contains a magnetic seal 10 which is attached to that side of the door leaf 5 facing the coolable interior 4, and which fits closely against the front of the body 2 when the door leaf 5 is closed. The magnetic seal 10 is elastic and therefore, when a person presses on the closed door leaf 5, the door leaf moves slightly in the direction of the coolable interior 4, whereby the air pressure within the coolable interior 4 changes. As a result of the elastic magnetic seal 10, the magnetic seal 10 does not detach from the body 2 immediately when a person pulls on the closed door leaf 5, whereby the air pressure within the coolable interior 4 again changes.

In the case of the present exemplary embodiment, the electromechanical opening assistance device 20 is so embodied as to detect the wish of a person to open the door leaf 5 as soon as the person pulls or presses on the closed door leaf 5. The actuator 22 thereupon automatically moves the plunger from its retracted position into its extended position. During this movement, the plunger pushes the door leaf 5 at least so far open that the magnetic seal 10 detaches from the body 2, such that the person can fully open the door leaf 5 more easily.

It is therefore possible, e.g. by measuring and analyzing the change in the air pressure within the coolable interior 4, to infer that a person is pulling or pressing on the door leaf 5 and therefore that the person wishes to open the closed door leaf 5. It is possible accordingly to provide a sensor device which is known per se to a person skilled in the art and a corresponding control device in order to activate the electromechanical actuator 22 when the wish of a person to open the closed door leaf 5 is detected, such that the closed door leaf 5 or the closed drawer is automatically opened at least partially as a result of the operating element 21 being displaced by the electromechanical actuator 22.

The household refrigeration appliance 1 can also have a drawer 8, which can be at least partially withdrawn from the coolable interior 4 and pushed into the coolable interior 4. In its pushed-in state the drawer 8 closes the coolable interior 4. If the drawer 8 is withdrawn at least partially from the coolable interior 4, the drawer is then open. The electromechanical opening assistance device 20 can therefore also be provided for the purpose of detecting the wish of a person to open the drawer and automatically opening the drawer at least partially accordingly.

In the case of the present exemplary embodiment, the electromechanical opening assistance device 20 is so embodied as to detect the wish of a person to open the drawer as soon as the person pulls or presses on the closed drawer. The actuator 22 thereupon automatically moves the plunger from its retracted position into its extended position. During this movement, the plunger pushes the drawer at least so far out of the coolable interior 4 that the magnetic seal 10 of the drawer detaches from the body 2, such that the person can fully open the drawer more easily.

Figure 3:
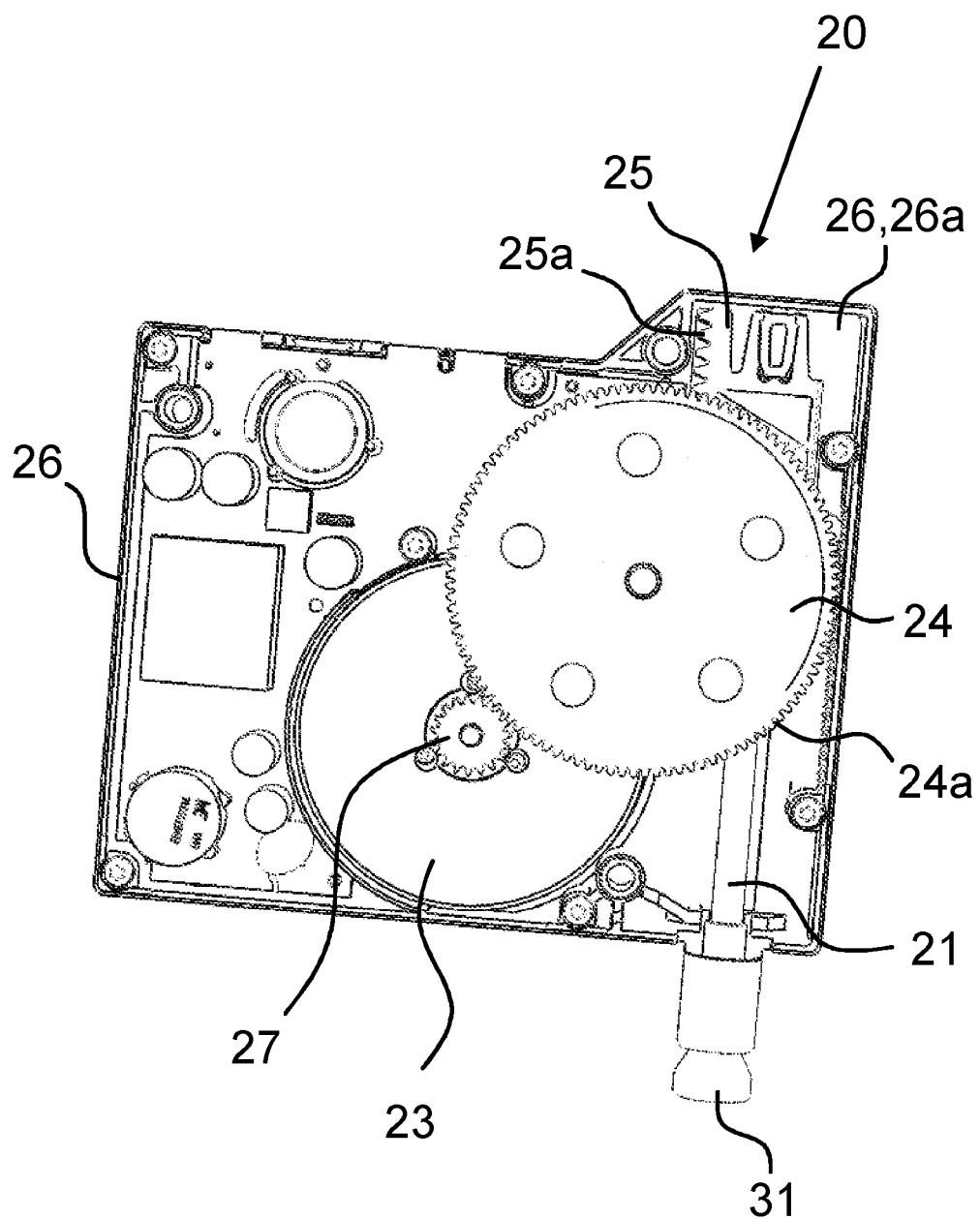
FIG. 3 is a plan view of an embodiment variant of the electromechanical opening assistance device.
Figure 4:
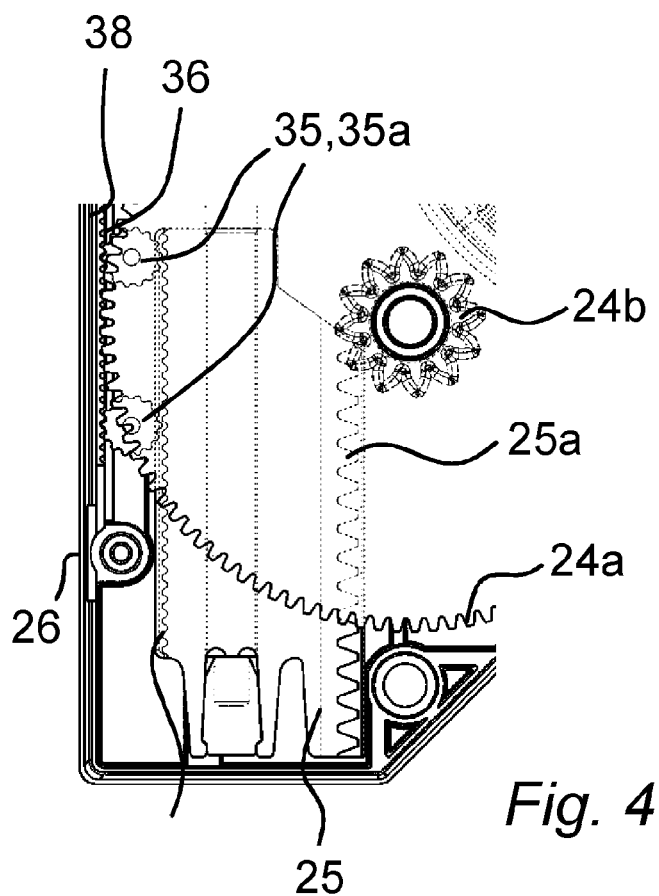
FIG. 4 is a partial sectional view of the electromechanical opening assistance device according to FIG. 3.
Figure 5:
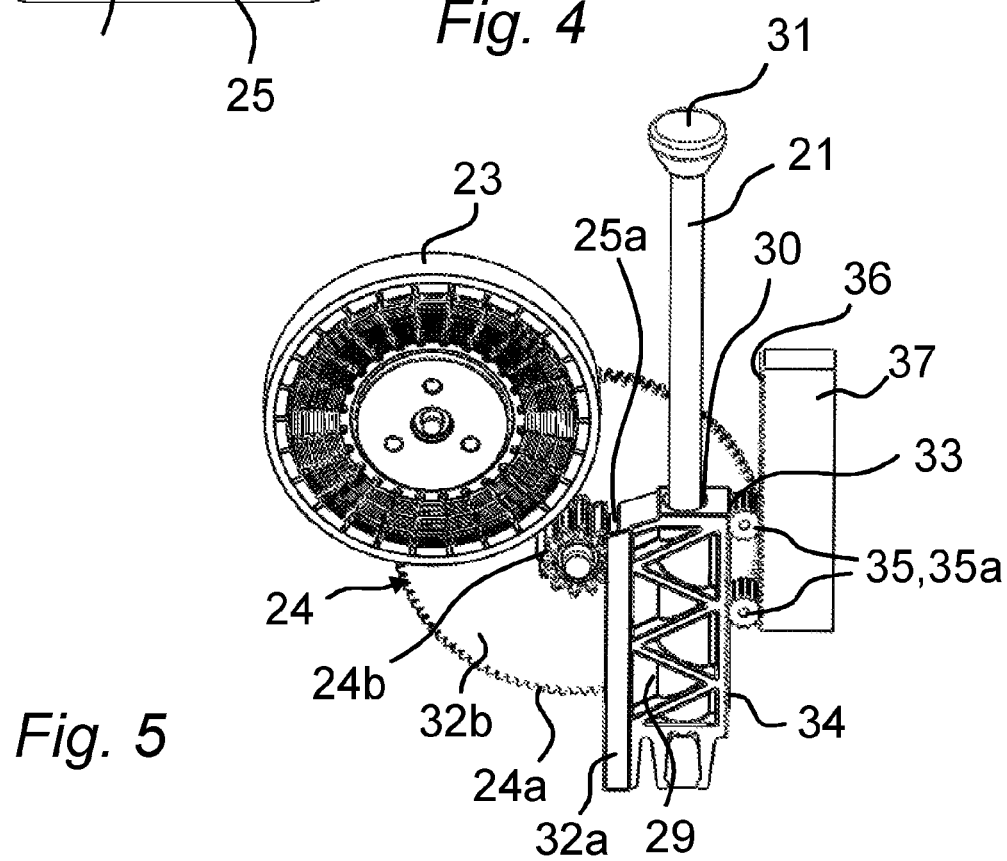
FIG. 5 is a perspective view of the electromechanical opening assistance device according to FIG. 3 with the housing removed.
Figure 6:
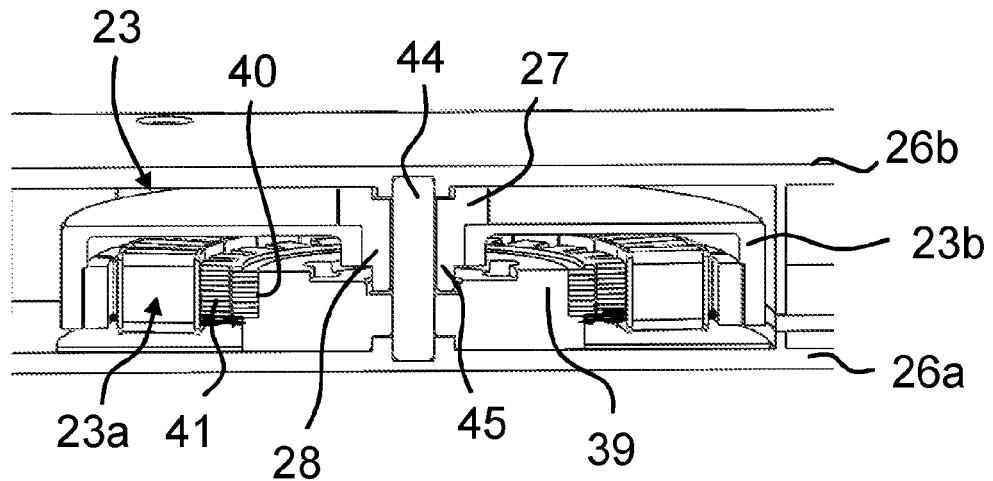
FIG. 6 is a cut-away perspective view of a first embodiment variant of a motor.
Figure 7:
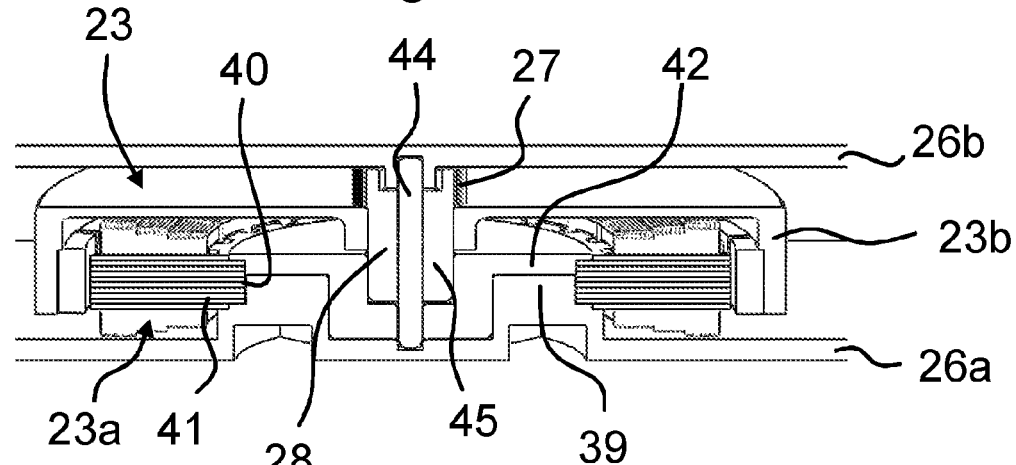
FIG. 7 is a cut-away perspective view of a second embodiment variant of the motor.
Figure 8:
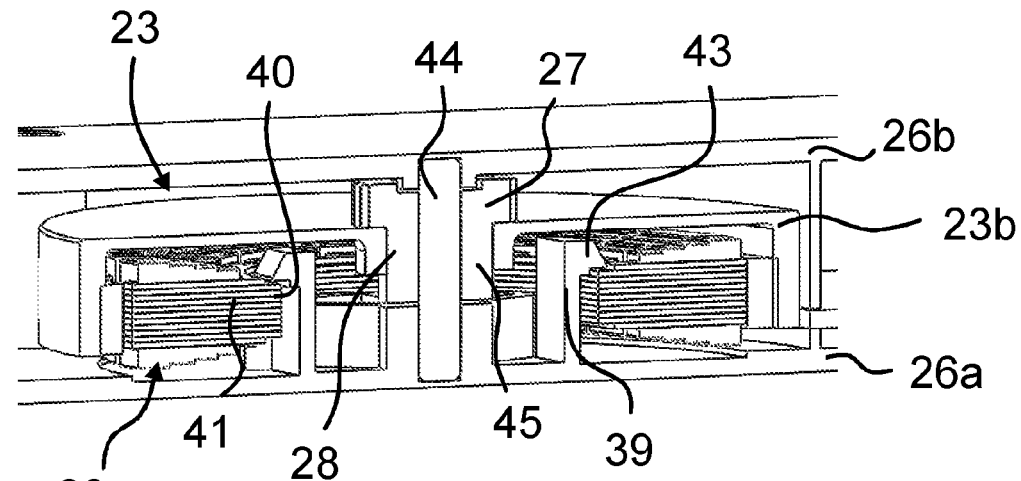
FIG. 8 is a cut-away perspective view of a third embodiment variant of the motor.

The electromechanical actuator 22 contains the electric motor 23, a drive pinion 27, the cylindrical gear with dual gearing 24, and the toothed rack 25. As illustrated in FIGS. 6 to 8 in particular, the drive pinion 27 is connected to a motor shaft 28 of the motor 23. The drive pinion 27 meshes with an input gearing 24a of the cylindrical gear with dual gearing 24, as illustrated in FIG. 3 in particular. The cylindrical gear with dual gearing 24 also has an output gearing 24b, which engages in a toothed rack profile 25a of the toothed rack 25, as illustrated in FIGS. 4 and 5 in particular. The toothed rack 25 is connected to the operating element 21.

In the illustrated exemplary embodiment, as illustrated in FIG. 5 in particular, the toothed rack 25 is formed on a main body 29. The main body 29 has a holder 30 into which the operating element 21, in particular the plunger, is inserted and locked. The operating element 21, in particular the plunger, has a cap 31 at its free end. The cap 31 can be e.g. pushed or screwed onto the end of the operating element 21, in particular the plunger. In particular, in the case of an operating element 21 or plunger which is made of a metallic material such as steel, the cap 31 can be made of a synthetic material. The cap 31 comes into contact with the inner side of the door leaf 5 or drawer front that is to be opened, at least during the automatic opening process. Furthermore, the main body 29 also has a first cheek 32a, which axially supports the output gearing 24b of the cylindrical gear with dual gearing 24.

The main body 29 has a rolling surface 34, in the form of an undulating profile in particular, on a toothed rack wall 33 of the toothed rack 25 or the main body 29, the toothed rack wall 33 being on the opposite side to the toothed rack profile 25a. In the case of the present exemplary embodiment, two rolling elements 35 in the form of toothed supporting rollers 35a roll on the rolling surface 34. The toothed supporting rollers 35a each have an undulating profile in the case of the present exemplary embodiment. FIGS. 4 and 5 show that the rolling elements 35, in particular the supporting rollers 35a, are supported against the housing 26 by a fixed second rolling surface 36 on that side of the rolling elements 35 or supporting rollers 35a which is opposite to the rolling surface 34. The second rolling surface 36 can be formed on a separate supporting element 37 which is fastened to the housing 26, as illustrated in FIG. 5, or so formed as to be directly integral with an inner wall 38 of the housing 26, as illustrated in FIG. 4.

FIG. 5 shows in particular that the cylindrical gear with dual gearing 24 can form a second cheek 32b, on which not only the output gearing 24b or the toothed rack profile 25a is axially guided, but on which the at least one rolling element 35 or the two supporting rollers 35a are also axially guided at the same time.

The electromechanical opening assistance device 20 has the housing 26 and in particular two housing halves 26a, 26b accordingly, wherein the housing 26, the housing halves 26a, 26b, the drive pinion 27, the cylindrical gear with dual gearing 24, the toothed rack 25 and/or the at least one rolling element 35 or the two supporting rollers 35a are made of glass-fiber reinforced polyamide (PA-GF).

At least the electric motor 23, the drive pinion 27, the cylindrical gear with dual gearing 24, the toothed rack 25 and the operating element 21 are arranged, mounted or fastened between the two housing halves 26a, 26b.

FIGS. 6 to 8 show three embodiment variants in which a fastening projection 39 is arranged on one of the two housing halves 26a of the electromechanical opening assistance device 20. The respective electric motor 23 has a stator 23a with a central opening 40. In the embodiment variants shown, the central opening 40 is formed by an inner annular surface wall of a stator laminated core 41. In order to fasten the stator 23a to the housing half 26a, it is fixed onto the fastening projection 39 by the central opening 40, i.e. the stator 23a is placed onto the fastening projection 39 in such a way that the fastening projection 39 passes through the central opening 40.

FIG. 6 shows a first embodiment variant, wherein the stator 23a is pressed onto the fastening projection 39 with frictional engagement using a seating fit. To this end, the internal diameter of the central opening 40 of the stator 23a is adapted to the external diameter of the fastening projection 39.

FIG. 7 shows a second embodiment variant, wherein the stator 23a is placed onto the fastening projection 39 first and then fastened with positive engagement by means of a separate, detachably fastened end cover 42. To this extent, the stator 23a is fixed with positive engagement between the fastening projection 39 and the end cover 42 in an axial direction, and fixed with at least frictional engagement, and optionally also with positive engagement, in a radial direction.

FIG. 8 shows a third embodiment variant, wherein the stator 23a is placed onto the fastening projection 39 and is locked on by at least one and in particular a plurality of locking hooks 43 which are preferably distributed uniformly over the area. At its foot section, the at least one locking hook 43 is permanently connected to the fastening projection 39 or formed integrally therewith, and the elastic head section of the locking hook 43 grasps the stator 23a, in particular the stator laminated core 41, from the outside.

In all three embodiment variants, the electromechanical opening assistance device 20 has a rigid axle pin 44 which is mounted between the two housing halves 26a, 26b. The rotor 23b has a hollow rotor shaft 45 which is rotatably mounted on the axle pin 44 and seated rotatably between the two housing halves 23a, 23b.

The following is a summary list of reference numerals and the corresponding structure used in the above description of the invention:

1 Household refrigeration appliance
2 Body
3 Inner container
4 Coolable interior
5 Door leaf
6 Door trays
7 Shelf bases
8 Drawer
9 Electronic control device
10 Magnetic seal
20 Electromechanical opening assistance device
21 Operating element
22 Electromechanical actuator
23 Motor
23a Stator
23b Rotor
24 Cylindrical gear with dual gearing
24a Input gearing
24b Output gearing
25 Toothed rack
25a Toothed rack profile
26 Housing
26a First housing half
26b Second housing half
27 Drive pinion
28 Motor shaft
29 Main body
30 Holder
31 Cap
32a First cheek
32b Second cheek
33 Toothed rack wall
334 First rolling surface
35 Rolling element
35a Supporting rollers
36 Second rolling surface
37 Supporting element
38 Inner wall
39 Fastening projection
40 Central opening
41 Stator laminated core
42 End cover
43 Locking hook
44 Axle pin
45 Hollow rotor shaft

The invention claimed is:

1. A household refrigeration appliance, comprising:
a heat-insulated body having an inner container with a coolable interior for storing foodstuffs;
a refrigeration device for cooling said coolable interior;
an electromechanical opening assistance device having an operating element;
a drawer;
a door leaf hinged relative to said heat-insulated body and provided for opening and closing said coolable interior or said drawer which is pushed into said coolable interior in a closed state, to close said coolable interior, and is withdrawn at least partially from said coolable interior in an open state; and
said electromechanical opening assistance device having an electromechanical actuator configured when activated to automatically open said closed door leaf or said closed drawer at least partially by repositioning said operating element of said electromechanical opening assistance device, said electromechanical actuator having an electric motor with a motor shaft, a drive pinion, a cylindrical gear with dual gearing and having an input gearing, and a toothed rack with a toothed rack profile, said toothed rack having a first rolling surface on a toothed rack wall on an opposite side to said toothed rack profile, said drive pinion connected to said motor shaft of said electric motor and meshing with said input gearing of said cylindrical gear with dual gearing, said cylindrical gear with dual gearing having output gearing engaging with said toothed rack profile of said toothed rack, and said toothed rack being connected to said operating element;

a housing; and at least one rolling element rolling on said first rolling surface and being further supported, on a side thereof opposite said first rolling surface, against said housing.

2. The household refrigeration appliance according to claim 1, wherein said drive pinion is disposed at such a distance from said cylindrical gear with dual gearing that an outside diameter of said drive pinion comes into contact with a pitch diameter of said input gearing of said cylindrical gear with dual gearing, or a pitch diameter of said drive pinion comes into contact with an outside diameter of said input gearing of said cylindrical gear with dual gearing.

3. The household refrigeration appliance according to claim 1, wherein:

said cylindrical gear with dual gearing forms a cheek; or
said toothed rack has a cheek on which said at least one rolling element or said output gearing is axially guided.

4. The household refrigeration appliance according to claim 3, wherein said electromechanical opening assistance device has a housing having two housing halves, and at least one of said housing, said housing halves, said drive pinion, said cylindrical gear with dual gearing, said toothed rack, said at least one rolling element or said operating element are made of glass-fiber reinforced polyamide.

5. The household refrigeration appliance according to claim 3, wherein said electromechanical opening assistance device has a housing in which at least said electric motor, said drive pinion, said cylindrical gear with dual gearing, said toothed rack, said at least one rolling element and said operating element are disposed, mounted or fastened.

6. The household refrigeration appliance according to claim 5, wherein said housing has two housing halves.

7. The household refrigeration appliance according to claim 1, wherein said electric motor is a permanent-field alternating-current synchronous motor which is operated at a rotational speed between 500 and 1,000 revolutions per minute.

8. The household refrigeration appliance according to claim 1, wherein said at least one rolling element is at least one smooth-wall or toothed supporting roller.

9. The household refrigeration appliance according to claim 1, wherein said electric motor is a permanent-field alternating-current synchronous motor which is operated at a rotational speed between 700 and 800 revolutions per minute.

10. A household refrigeration appliance, comprising:

a heat-insulated body having an inner container with a coolable interior for storing foodstuffs;
a refrigeration device for cooling said coolable interior;
an electromechanical opening assistance device having an operating element;
a drawer;
a door leaf hinged relative to said heat-insulated body and provided for opening and closing said coolable interior or said drawer which is pushed into said coolable interior in a closed state, to close said coolable interior, and is withdrawn at least partially from said coolable interior in an open state; and said electromechanical opening assistance device having an electromechanical actuator configured when activated to automatically open said closed door leaf or said closed drawer at least partially by repositioning said operating element of said electromechanical opening assistance device, said electromechanical opening assistance device having a first housing half and a second housing half, at least one of said first and second housing halves having a fastening projection, said electromechanical actuator having an electric motor with a motor shaft, a drive pinion, a cylindrical gear with dual gearing and having an input gearing, and a toothed rack with a toothed rack profile, and said electric motor having a stator with a central opening a fastening to one of said first and second housing halves, said fastening opening being fixed onto said fastening projection, said drive pinion connected to said motor shaft of said electric motor and meshing with said input gearing of said cylindrical gear with dual gearing, said cylindrical gear with dual gearing having output gearing engaging with said toothed rack profile of said toothed rack, and said toothed rack being connected to said operating element.

11. A household refrigeration appliance, comprising:

a heat-insulated body having an inner container with a coolable interior for storing foodstuffs;
a refrigeration device for cooling said coolable interior;
an electromechanical opening assistance device having an operating element;
a drawer;
a door leaf hinged relative to said heat-insulated body and provided for opening and closing said coolable interior or said drawer which is pushed into said coolable interior in a closed state, to close said coolable interior, and is withdrawn at least partially from said coolable interior in an open state; and said electromechanical opening assistance device having an electromechanical actuator configured when activated to automatically open said closed door leaf or said closed drawer at least partially by repositioning said operating element of said electromechanical opening assistance device, said electromechanical opening assistance device having a first housing half, a second housing half, and a rigid axle pin mounted between said first and second housing halves, and said electromechanical actuator having an electric motor with a motor shaft, a drive pinion, a cylindrical gear with dual gearing and having an input gearing, and a toothed rack with a toothed rack profile, said electric motor having a rotor with a hollow rotor shaft being rotatably mounted on said rigid axle pin and being seated rotatably between said first and second housing halves, said drive pinion connected to said motor shaft of said electric motor and meshing with said input gearing of said cylindrical gear with dual gearing, said cylindrical gear with dual gearing having output gearing engaging with said toothed rack profile of said toothed rack, and said toothed rack being connected to said operating element.

12. The household refrigeration appliance according to claim 11, wherein said rotor is a permanent-magnet rotor.

13. A household refrigeration appliance, comprising:

a heat-insulated body having an inner container with a coolable interior for storing foodstuffs;
a refrigeration device for cooling said coolable interior;

an electromechanical opening assistance device having an operating element;
a drawer;
a door leaf hinged relative to said heat-insulated body and provided for opening and closing said coolable interior or said drawer which is pushed into said coolable interior in a closed state, to close said coolable interior, and is withdrawn at least partially from said coolable interior in an open state; and
said electromechanical opening assistance device having an electromechanical actuator configured when activated to automatically open said closed door leaf or said closed drawer at least partially by repositioning said operating element of said electromechanical opening assistance device, said electromechanical opening assistance device having a first housing half and a second housing half, at least one of said first and second housing halves having a fastening projection, said electromechanical actuator having an electric motor with a motor shaft, a drive pinion, a cylindrical gear with dual gearing and having an input gearing, and a toothed rack with a toothed rack profile, and said electric motor having a stator with a stator winding with a central opening for fastening to one of said first and second housing halves, said fastening opening being at least one of pressed, pushed or locked onto said fastening projection, said drive pinion connected to said motor shaft of said electric motor and meshing with said input gearing of said cylindrical gear with dual gearing, said cylindrical gear with dual gearing having output gearing engaging with said toothed rack profile of said toothed rack, and said toothed rack being connected to said operating element.

* * * * *